July 20, 1948.    W. S. MELVILLE    2,445,582
THERMIONIC VALVE AND CIRCUIT MOUNTING
Filed Oct. 30, 1946

Inventor:
William S. Melville,
by Merton D. Moore
His Attorney.

Patented July 20, 1948

2,445,582

UNITED STATES PATENT OFFICE 2,445,582

THERMIONIC VALVE AND CIRCUIT MOUNTING

William S. Melville, Rugby, England, assignor to General Electric Company, a corporation of New York Application October 30, 1946, Serial No. 706,661
In Great Britain November 7, 1945

7 Claims. (Cl. 250—27.5)

This invention relates to thermionic valve apparatus and more particularly to a construction for mounting and housing thermionic valves and associated circuit components.

An object of the invention is to provide an improved, readily assembled construction for housing electronic equipment, wherein the equipment may be hermetically sealed yet readily made available for servicing when necessary.

A further object of the invention is to provide compact mounting and housing devices for thermionic valve apparatus which may be hermetically sealed, wherein the circuit components are substantially completely shielded from external interference, and those components in which heat is generated are effectively cooled.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is a partially cutaway view of the apparatus according to the invention and Fig. 2 is an end view of the section of the apparatus taken at line 2—2 of Fig. 1.

Figure 1:
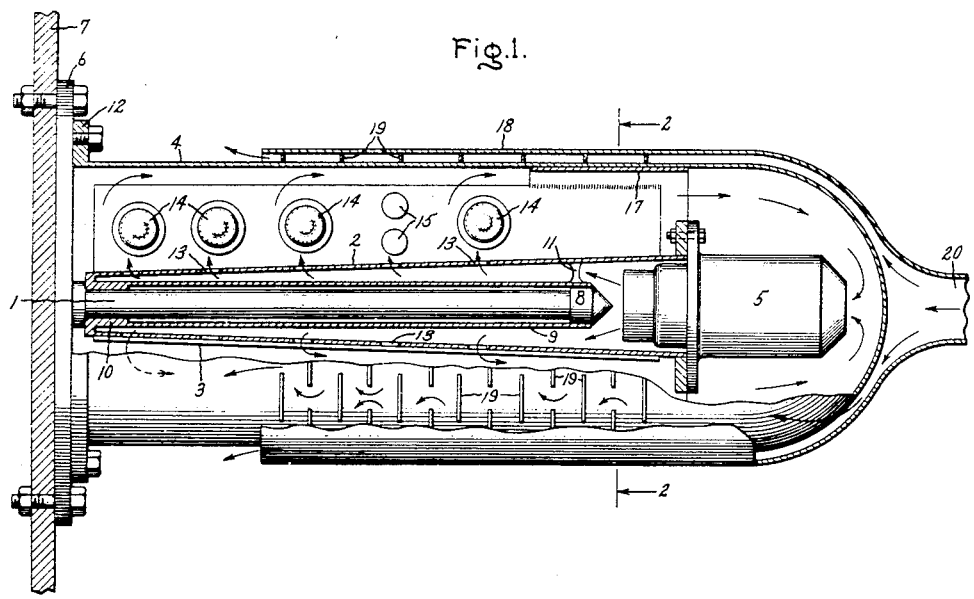
Figure 2:
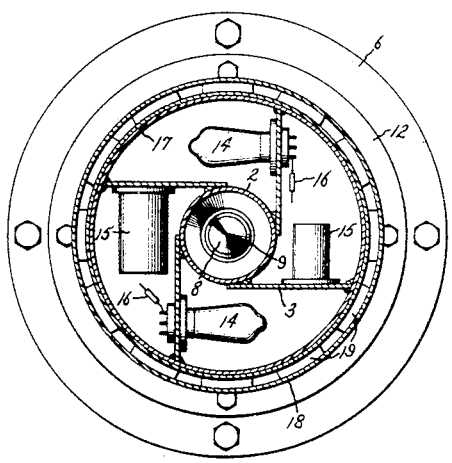

As seen in Fig. 1 the apparatus of my invention comprises a central supporting post 1 about which a hollow tube 2 is mounted. Tube 2 supports flat, plate-like chassis members 3 which may be welded thereon as best shown in Fig. 2. A dome shaped casing 4 completely surrounds and hermetically seals the aforementioned members. A blower and motor unit 5 serves to circulate a fluid cooling medium, such as air or gas, throughout the casing to cool those circuit components which generate heat. The supporting post 1 is preferably secured to a mounting plate 6 which may be arranged with holes for through-bolting to a supporting wall 7 or other structure. The post carries a raised journal member 8 at the end opposite the supporting plate 6 and is completely surrounded by an inner cylindrical hollow tube 9, the inner surface of which cooperates with journal member 8. A bearing portion 10 is formed on the inner wall of tube 9 for cooperation with the outer cylindrical surface of post 1. Tapered tube 2 at its smallest end is formed integrally with tube 9 and is also connected to the inner tube by a leg 11 near the other end to provide additional support. The arrangement thus described permits tube 2 to be rotated with tube 9 about supporting post 1, and also permits longitudinal sliding of tube 2 along tube 1 because of the telescoping arrangement of post 1, journal member 8, tube 9 and bearing portion 10.

Casing member 4 is preferably provided with a flange 12 which may be bolted to supporting plate 6 to provide an hermetic seal. Blower unit 5 is mounted on the end of tube 2 so as to collect air from one end of the casing 4 and expel it into tube 2, which acts as a duct member. Passageways in the form of perforations 13 are provided through the walls of tube 2, being so arranged as to direct streams of the fluid cooling medium toward desired components of the thermionic valve circuits. These components may comprise thermionic valves 14 and chokes, transformers or similar components 15, as well as resistance elements or capacitors 16. The fluid cooling medium, which may be air, directed against these elements serves to cool them and is returned along the inner wall of casing 4, which in turn removes the heat from the fluid medium. The flow of the cooling medium is indicated generally by arrows in Fig. 1. The casing itself is preferably of a metal which forms a heat exchange medium for transferring the heat to the outside atmosphere as well as an electrostatic and electromagnetic shield for the electronic circuit. A supporting ring or collar member 17 may be welded or otherwise fastened about the chassis member 3, the external diameter of which is slightly less than the diameter of casing member 4. Casing 4, when removal is necessary for servicing, may be slid over the surface of collar 17 after removal of the bolts through flange 12.

In order that casing member 4 may be cooled more rapidly than by the natural circulation of the atmosphere about the casing, jacket 18 is provided to partially enclose casing 4 and furnish a means of forced cooling across the outer surface of the casing. The inner wall of jacket 18 is preferably provided with baffles 19 so arranged as to present a tortuous passage for cooling air forced in through throat 20 by an external blower, not shown. If jacket 18 is of metal, it may be used to increase the electromagnetic shielding effect of casing 4.

To service the apparatus in the event of malfunctioning of the thermionic valve circuit, jacket 18 is removed, the bolts holding flange 12 are taken out and casing member 4 is withdrawn over collar 17. As will be apparent from the drawings, all of the circuit components, including the valves 14, are now readily available for such servicing or replacement as may be necessary. The particular chassis member on which defective components are found may be brought into the most convenient position for repair or replacement by rotating tubes 2 and 9 about supporting post 1 so as to position the selected chassis member in the best working position. In addition, if obstructions exist near the apparatus, it is possible to slide tubes 2 and 9 along post 1 so as to move the chassis members 3 away from wall 7 up to a distance slightly less than the length of post 1. Upon completion of the repairs, post 1 is again telescoped into tube 9, casing 4 is replaced over collar 17 and bolted down by flange 12 to supporting plate 6, and the jacket 18 is replaced.

While tube 2 is shown in the drawings as frustro-conical in configuration, it may be either circular or polygonal in cross section but preferably tapered, at least internally, for the better distribution of the cooling medium. Chassis members 3, while preferably flat, may be of other desired shapes, and may be secured to tube 2 tangentially, as shown, radially, or as otherwise desired. The members may be secured by bolting, soldering, riveting, welding or otherwise, to the tube 2. When a tube of polygonal cross section is employed, the plates may be attached to the tube so as to extend parallel to the faces of the polygon.

By mounting the thermionic valves and major circuit components on corresponding faces of the chassis members, as shown in Fig. 2, most of the circuit connections will normally fall on the opposite side of each chassis plate and may readily be selected by a repair man on one side of the apparatus by rotating tube 2, whereas replacement of components may be more conveniently accomplished on each chassis member from the other side of the apparatus.

The tapering of tube 2, as well as the relative areas of perforations 13, are preferably so proportioned as to provide substantially equal flow of the cooling medium across all components along the chassis plates which generate the same amount of heat, though some of the openings may be larger or smaller for elements which generate more or less heat. The openings remote from blower unit 5 should normally be larger than those near the blower to equalize the rate of flow to the remote components.

If it is desired so to arrange the apparatus that tube 2 may be withdrawn from mounting plate 6 a distance greater than is permitted by the construction shown, post 1 may be made up of a plurality of telescoping elements to permit outward movement of journal member 8 from the end of the post.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. Thermionic valve apparatus comprising a plurality of chassis members for electronic circuit elements, hollow perforated telescoping mounting means peripherally supporting said members in spaced relationship about said means, a removable casing hermetically enclosing said means and said members, said casing containing a fluid cooling medium, means within said casing for circulating said medium, said perforated mounting means comprising a duct whereby said medium is directed through the perforations substantially radially with respect to said mounting means.

2. Thermionic valve apparatus comprising a supported chassis device for electronic circuit components, said device comprising an elongated mounting post, a coaxially disposed elongated tube rotatably mounted on said post in telescoping engagement therewith, and peripherally extending means attached to said tube for mounting said electronic circuit components; an hermetically sealed casing member enclosing said device; and a blower within said casing for circulating a fluid heat transfer medium, said tube comprising a duct for said medium and being perforated to concentrate the flow of said medium in the vicinity of those of said components in which heat is generated.

3. Thermionic valve apparatus comprising a supported chassis device for electronic circuit components, said device comprising an elongated post, a coaxially disposed elongated tube rotatably mounted on said post in telescoping engagement therewith, and peripherally extending means attached to said tube for mounting said electronic circuit components; an hermetically sealed casing member enclosing said mounting device; a blower within said casing for circulating a fluid cooling medium, said tube comprising a duct for said medium and having perforations to concentrate the flow of said medium in the vicinity of those of said components in which heat is generated, said casing comprising a heat exchange member for cooling said medium; and external means for cooling said casing.

4. A thermionic valve device comprising an elongated perforated tubular member, a cylindrical supporting post extending from a mounting base into said member, said member being provided with an internal bearing surface slidingly and rotatably supporting said member on said post, electronic circuit components mounted on plates attached to and extending peripherally from said member, a blower attached to said member for circulating a fluid cooling medium through said member, said member having perforations to direct said medium against those of said components in which heat is generated.

5. Thermionic valve apparatus comprising a plurality of chassis for electronic circuit elements, two elongated telescoped mounting members, one of said members being supported at one end by an external supporting structure, the other of said members mounting said chassis peripherally around said members as telescoped, said one of said members supporting said other member in longitudinally slidable relationship whereby said chassis may be moved away from said structure.

6. Thermionic valve apparatus comprising a plurality of chassis for electronic circuit components, an elongated mounting member for said chassis, an elongated supporting member in telescoping relationship with said mounting member, cooperating cylindrical bearing surfaces formed on said respective members supporting said mounting member in relatively rotatable and longitudinally slidable relation on said supporting member, and means supporting said supporting member on an external structure.

7. Thermionic valve apparatus comprising an elongated mounting post, a coaxially disposed elongated tube rotatably mounted on said post in telescoping engagement therewith, peripherally extending means attached to said tube mounting electronic circuit components, said tube comprising a duct for a fluid head transfer medium and being perforated adjacent those of said components which generate heat during operation, and a blower mounted on said tube for circulating said medium through said tube and said perforations and about said heat generating components.

WILLIAM S. MELVILLE.

REFERENCES CITED

The following references are of record in the file of this patent:

UNITED STATES PATENTS

| Number | Name | Date |
|---|---|---|
| 2,394,060 | Holmes | Feb. 5, 1946 |
| 2,401,637 | Harries | June 4, 1946 |